Patented Aug. 20, 1940

2,211,828

UNITED STATES PATENT OFFICE 2,211,828

MANUFACTURE OF TITANIUM DIOXIDE PIGMENTS

Franklin L. Kingsbury, St. Louis, and Charles L. Schmidt, Webster Groves, Mo., assignors to National Lead Company, New York, N. Y., a corporation of New Jersey No Drawing. Application October 9, 1937, Serial No. 168,172

9 Claims. (Cl. 134—58)

This invention relates to titanium dioxide pigments and has particular reference to pigments of this character possessing enhanced tinting strength.

Tinting strength has been defined by the American Society of Testing Materials and as so defined is discussed by H. A. Gardner on pages 69 and 70 of the eighth edition (1937) of his Physical and Chemical Examination of Paints, Varnishes, Lacquers and Colors. This discussion is quoted here in full because an understanding thereof will assist in a proper appreciation of our invention:

"As defined by the American Society for Testing Materials, tinting strength is the power of coloring a given quantity of paint or pigment selected as a medium standard for estimating such power. Some methods and writers use the expression 'staining power'. The definition implies that the determination is applicable to colored pigments only, but the tinting strength of white pigments has long been used in their evalution, as it affords a quick test of uniformity. There is no difference in the actual determination of tinting strength of colored and white pigments, but the calculations are the converse of each other. Application of the test on white pigments is logical because the term 'color' properly includes the achromatic colors, white, gray, and black. However, it might be better to refer to this property of white pigments as 'lightening' power, or 'brightening' power, a term used by Haslam in his hiding power studies."

The tinting strength of a white pigment may be determined according to several methods. Those in general use are described by Gardner, supra, on pages 83–95. As will be seen from an examination of these methods results obtained are related to the value of an accepted standard, i. e., white lead.

In this description of our invention the tinting strength values gives are expressed as determined by the Reynolds method as described in Gardner, supra, on the basis of the value of 100 for basic carbonate white lead pigment.

The tinting strength of titanium dioxide pigment as prepared at the present time by the commonly employed methods seldom exceeds about 1200. An increase above this figure is greatly to be desired but the prior art offers no means of attaining it.

We have now discovered means whereby the tinting strength of titanium dioxide may be increased to values around 1400. Our invention may broadly be described as a method for preparing titanium pigments which includes the hydrolytical precipitation of hydrous titanium oxide from a titanium sulfate solution containing a relatively small predetermined quantity of rare earth elements, including cerium, yttrium and lanthanum.

In order that our invention be fully understood we will now describe the essential steps in the preparation of titanium dioxide pigments. A titaniferous mineral, usually ilmenite, is reacted with sulfuric acid to form a water-soluble digestion mass, in the manner as described, for example, in U. S. Patents Nos. 1,333,819 and 1,889,027. This water-soluble digestion mass is then dissolved in water to form the crude titanium sulfate solution. This crude solution is then clarified, e. g., by the use of clarifying agents, filtration, etc., and then subjected to a reducing treatment. If desired, in cases where titaniferous materials, such as ilmenite, which are rich in iron are employed, the solution is cooled and part or all of the iron removed by crystallization as ferrous sulfate. The reduced and clarified solution is then ready for hydrolysis which is effected by heating the solution to the boiling point until substantially all the titanium is precipitated as hydrous titanium oxide containing variable quantities of combined or adsorbed sulfuric acid. This hydrous titanium oxide is washed and calcined at temperatures between about 825° C. to 1000° C. to develop crystallinity and pigment properties. After calcination the titanium dioxide so produced is pulverized and is then ready for use.

Commercial processes in use at the present time may include one or more refinements and improvements such as the use of nuclei to accelerate and facilitate the hydrolytic precipitation of hydrous titanium oxide, oxidizing or reducing treatments of the hydrous titanium oxide, etc., but the above enumerated steps are fundamental and are part of all commercially feasible processes for the manufacture of titanium pigments.

We have found that if small predetermined quantities of substances containing rare earth elements and cerium, yttrium, and lanthanum are operably incorporated with the titaniferous material at any stage of the process prior to hydrolysis of the titanium sulfate solution the titanium dioxide resulting from the calcination of the hydrous titanium oxide obtained by hydrolysis from a solution so treated will possess, after pulverization, an enhanced tinting strength.

The rare earth elements include some thirteen elements having atomic numbers from 57 to 71 inclusive. Concerning these elements and their physical and chemical behavior, the famous chemist, W. Crookes, has said, as quoted by J. W. Mellor: on page 985 of his "Modern Inorganic Chemistry" 8th ed. (New Impression) January 1935:

"The rare earths form a group to themselves; chemically, they are so much alike that it taxes the utmost skill of the chemist to effect even a partial separation, and their history is so obscure that we do not yet know the number of them."

This statement applies also to the operability of the rare earth elements in the practice of our invention. In some instances we have not been able to obtain relatively pure compounds of all these rare earths but those which we have obtained and mixtures of these with others not obtainable pure have all been effective. Therefore, in this description and in the claims appended hereto we intend that the expression "rare earth elements" shall include all thirteen elements having atomic numbers from 59 to 71, as follows: praseodymium, No. 59; neodymium, No. 60; illinium, No. 61; samarium, No. 62; europium, No. 63; gadolinium, No. 64; terbium, No. 65; dysprosium, No. 66; holmium, No. 67; erbium, No. 68; thulium, No. 69; ytterbium, No. 70; lutecium, No. 71.

In addition to these thirteen rare earth elements, we have found that cerium, atomic No. 58; yttrium, atomic No 39; and lanthanum, atomic No. 57, are also effective in producing the improved results of our invention. An excellent source of rare earth elements, including cerium and lanthanum for use in the practice of our invention is the mineral monazite which is a mixture of phosphates of cerium, lanthanum and what was formerly called didymium, now known to consist of praseodymium and neodymium.

In practicing our invention the rare earth containing material may be added to the titaniferous material at any stage of the process prior to the hydrolysis of the titanium solution. Consequently, the question of solubility of the rare earth material is not important. If, for example, the available rare-earth material such as monazite is not soluble in the titanium sulfate solution it may be added to the titaniferous material prior to the digestion with sulfuric acid. The intensity of this reaction is such that the rare-earth material will also be converted to soluble form. On the other hand, it is most convenient in order to control the quantities of rare earth to employ a salt, e. g., cerium sulfate, which is soluble in the titanium solution and to add such a salt directly to the hydrolysis solution prior to heating. When practicing my invention, particularly when using cerium sulfate, it will often be found that the presence of a small amount of phosphate, preferably added as phosphoric acid, say from about 0.1 per cent to about 2.0 per cent, calculated as $P_2O_5$ and based on the weight of titanium dioxide, $TiO_2$, in solution, further improves the tinting strength and color of the resulting products.

The quantities of the rare earth elements and those of cerium, yttrium and lanthanum which are operable in the practice of our invention may be regarded as mere traces. Quantities between about 0.02 per cent to about 0.5 per cent calculated as the oxide of the element on the basis of the $TiO_2$ present in the titaniferous material are sufficient to secure the desired results.

The practice of our invention is not necessarily limited to the preparation of substantially pure titanium dioxide but its advantages may be also attained in the preparation of composite pigments. For instance, an extender pigment such as barium sulfate, calcium sulfate and the like may be added to a titanium sulfate solution containing a small amount of rare earth elements and the titanium precipitated in the usual way as hydrous titanium oxide. The resulting composite precipitate of hydrous titanium oxide and extender is then washed, calcined and pulverized in the regular way to obtain a composite pigment possessing improved tinting strength.

Products prepared according to our invention possess generally improved color as well as tinting strength. That is to say, they are more nearly pure white, substantially free from subordinate color or tints which are sometimes referred to as "undertones."

Now, in order to explain our invention more fully the following examples are given for illustrative purposes only.

EXAMPLE I.—*The addition of the rare-earth containing element to the titaniferous are, prior to digestion*

2.0 grams of yttrium oxide were mixed with 2.0 kilograms of ilmenite and digested with strong sulfuric acid in the usual manner. The resulting digestion cake was dissolved in water; the resulting solution was clarified and subjected to a reducing treating, both in the well-known way. The clarified solution was treated in the usual fashion to produce titanium nuclei and hydrolyzed by heating to the boiling point for several hours. The pigment product obtained by calcining and pulverizing the hydrous titanium oxide so produced has a tinting strength value of 1350 as determined by the Reynolds method (cf. Gardner, supra).

A similar titanium dioxide prepared in the identical manner from the same titaniferous raw material, with the exception that no yttrium oxide was added prior to digestion, had a tinting strength value of 1150.

EXAMPLE II.—*The use of a soluble salt added to the titanium solution prior to hydrolysis*

To one liter of a titanium sulfate solution of approximately the following composition:

| | | |
|---|---|---|
| $TiO_2$ | per cent | 15.0 |
| $H_2SO_4$ | do | *29.0 |
| $FeSO_4$ | do | 14.0 |
| Sp. gr. | | 1.65 |

*Free and combined with titanium.

0.1 gram of cerium sulfate was added and the solution was stirred to dissolve the salt therein. The solution was warmed to about 70° C. and run into a volume of hot water in proportion of 70 parts titanium solution to 30 parts of water. The whole was heated to boiling and boiled until over 90% of the $TiO_2$ was precipitated. After calcination and the usual after-treatments the product had a tinting strength value of 1375 as determined by the Reynolds method (cf. Gardner, supra).

A pigment prepared by a similar procedure, omitting the addition of the cerium sulfate, had a tinting strength value of only 1175.

EXAMPLE III.—*Use of monazite*

To 2 kilograms of ilmenite, 2 grams of monazite was added. The monazite was obtained from the magnetic separation of the crude pulverized ilmenite.

After processing the ore as described under Example No. 1 the product obtained had a tinting strength as determined by the Reynolds method of 1360 whereas a similar product similarly prepared from the same ore to which no monazite had been added had a value of only 1140.

Our invention is applicable for use not only with the so-called basic titanium solutions, i. e., solutions in which there is present less sulfuric acid, free and combined with titanium, than is required to form normal titanium sulfate, $Ti(SO_4)_2$, but with acid titanium solutions, i. e., solutions in which there is present excess sulfuric acid, free and combined with titanium over that required to form the normal sulfate, $Ti(SO_4)_2$, as well.

The titanium dioxide pigments obtained from the practice of our invention may be employed wherever at present titanium dioxide pigments are used with the added advantages accruing from the enhanced tinting strength.

By the expression "titaniferous material" as herein employed as designating the material to which the rare-earth is added, we mean to include titaniferous ores and other sources of titanium and the intermediate products resulting from those steps of a process as above outlined which precede the hydrolysis. Thus, the expression includes the titaniferous ores, artificial sources of titanium such as hydrous titanium oxide or titanium dioxide previously prepared, the digestion mass and the titanium solution obtained therefrom.

This description of our invention has been given for clearness of understanding and no undue limitations should be deduced therefrom but the appended claims should be interpreted as broadly as possible in the light of the prior art.

We claim:

1. In a method for preparing titanium dioxide pigments which includes the hydrolytic precipitation of hydrous titanium oxide from a sulfuric acid solution of a titanium compound, the step which consists in heating a sulfuric acid solution of a titanium compound containing in solution a compound containing one or more elements selected from the group consisting of the rare earth elements, cerium, yttrium and lanthanum, in an amount between about 0.02 percent and 0.5 percent calculated as the oxide of the element and based upon the titanium dioxide, $TiO_2$, content of the titanium sulfate solution hydrolytically to precipitate therefrom hydrous titanium oxide.

2. In a method for preparing titanium dioxide pigments which includes the hydrolytic precipitation of hydrous titanium oxide from a sulfuric acid solution of a titanium compound, the step which consists in heating a sulfuric acid solution of a titanium compound containing in solution a compound containing one or more elements selected from the group consisting of the rare earth elements, cerium, yttrium and lanthanum, in an amount between about 0.02 percent and 0.5 percent calculated as the oxide of the element and based upon the titanium dioxide, $TiO_2$, content of the titanium sulfate solution and an amount of phosphate between about 0.1 percent and about 2.0 percent calculated as $P_2O_5$ and based on the titanium dioxide, $TiO_2$, content of the titanium sulfate solution hydrolytically to precipitate therefrom hydrous titanium oxide.

3. In a method for preparing titanium dioxide pigments which includes the hydrolytic precipitation of hydrous titanium oxide from a sulfuric acid solution of a titanium compound, the steps which consist in adding to a sulfuric acid solution of a titanium compound an amount of therein soluble salt or salts of one or more elements selected from the group consisting of the rare earth elements, cerium, yttrium and lanthanum, sufficient to produce a concentration of the element or elements between about 0.02 percent and 0.5 percent calculated as the oxide of the element and based on the titanium dioxide, $TiO_2$, content of the titanium sulfate solution and subsequently heating the resulting solution hydrolytically to precipitate therefrom hydrous titanium oxide.

4. In a method for preparing titanium dioxide pigments which includes the hydrolytic precipitation of hydrous titanium oxide from a sulfuric acid solution of a titanium compound, the steps which consist in adding to a sulfuric acid solution of a titanium compound an amount of therein soluble salt or salts of one or more elements selected from the group consisting of the rare earth elements, cerium, yttrium and lanthanum, sufficient to produce a concentration of the element or elements between about 0.02 percent and 0.5 percent calculated as the oxide of the element and based on the titanium dioxide, $TiO_2$, content of the titanium sulfate solution and an amount of phosphoric acid sufficient to produce a concentration between about 0.1 percent and 2.0 percent based on the titanium dioxide, $TiO_2$, content of the titanium sulfate solution and subsequently heating the resulting solution hydrolytically to precipitate therefrom hydrous titanium oxide.

5. In a method for preparing titanium dioxide pigments which includes the hydrolytic precipitation of hydrous titanium oxide from a sulfuric acid solution of a titanium compound, the steps which consist in adding to a sulfuric acid solution of a titanium compound an amount of therein soluble cerium sulfate sufficient to produce a concentration of cerium calculated as the oxide of cerium between about 0.02 per cent and 0.5 percent based on the titanium dioxide, $TiO_2$, content of the titanium sulfate solution and subsequently heating the resulting solution hydrolytically to precipitate hydrous titanium oxide.

6. In a method for preparing titanium dioxide pigments which includes the hydrolytic precipitation of hydrous titanium oxide from a sulfuric acid solution of a titanium compound, the steps which consist in adding to a sulfuric acid solution of a titanium compound an amount of therein soluble cerium sulfate sufficient to produce a concentration of cerium calculated as the oxide of cerium between about 0.02 percent and 0.5 percent based on the titanium dioxide, $TiO_2$, content of the titanium sulfate solution and an amount of phosphoric acid sufficient to produce a concentration of $P_2O_5$ between about 0.1 percent and 2.0 percent based on the titanium dioxide, $TiO_2$, content of the titanium sulfate solution and subsequently heating the resulting solution hydrolytically to precipitate therefrom hydrous titanium oxide.

7. In a method for the preparation of titanium dioxide pigments which includes the dissolution of a titaniferous material in sulfuric acid and the subsequent hydrolytic precipitation of hydrous titanium oxide from the resulting titanium sulfate solution, the steps which include admixing with the titaniferous material prior to hydrolysis an amount of a substance or substances containing one or more elements selected from the group consisting of the rare earth elements, cerium, yttrium and lanthanum, sufficient to produce a concentration of the element or elements between about 0.02 percent and 0.5 percent calculated as the oxide of the element and based on the titanium dioxide, $TiO_2$, content of the titanium sulfate solution and subsequently heating the resulting solution hydrolytically to precipitate therefrom hydrous titanium oxide.

8. In a method for the preparation of titanium dioxide pigments which includes the digestion of a titaniferous mineral with sulfuric acid, dissolution of the digestion cake in aqueous solution and the subsequent hydrolytic precipitation therefrom of hydrous titanium oxide, the steps which include admixing with the titaniferous mineral an amount of a substance or substances containing one or more elements selected from the group consisting of the rare earth elements, cerium, yttrium and lanthanum, sufficient to produce a concentration of the element or elements between about 0.02 percent and 0.5 percent calculated as the oxide of the element and based on the titanium dioxide, $TiO_2$, content of the digestion cake, dissolving the said digestion cake in aqueous media and subsequently heating the resulting solution hydrolytically to precipitate therefrom hydrous titanium oxide.

9. In a method for the preparation of titanium dioxide pigments which includes the digestion of a titaniferous mineral with sulfuric acid, dissolution of the digestion cake in aqueous solution and the subsequent hydrolytic precipitation therefrom of hydrous titanium oxide, the steps which include admixing with the titaniferous mineral an amount of monazite sufficient to produce a concentration of elements selected from the group consisting of the rare earth elements, cerium, yttrium and lanthanum contained in the monazite between about 0.02 percent and 0.5 percent calculated as the oxide of the element and based upon the titanium dioxide, $TiO_2$, content of the digestion cake, dissolving the said digestion cake in aqueous media and subsequently heating the resulting solution to precipitate hydrolytically therefrom hydrous titanium oxide.

FRANKLIN L. KINGSBURY.
CHARLES L. SCHMIDT.